May 30, 1944. T. R. HARRISON 2,349,963
MEASURING AND CONTROL APPARATUS
Filed Aug. 14, 1937 3 Sheets-Sheet 3
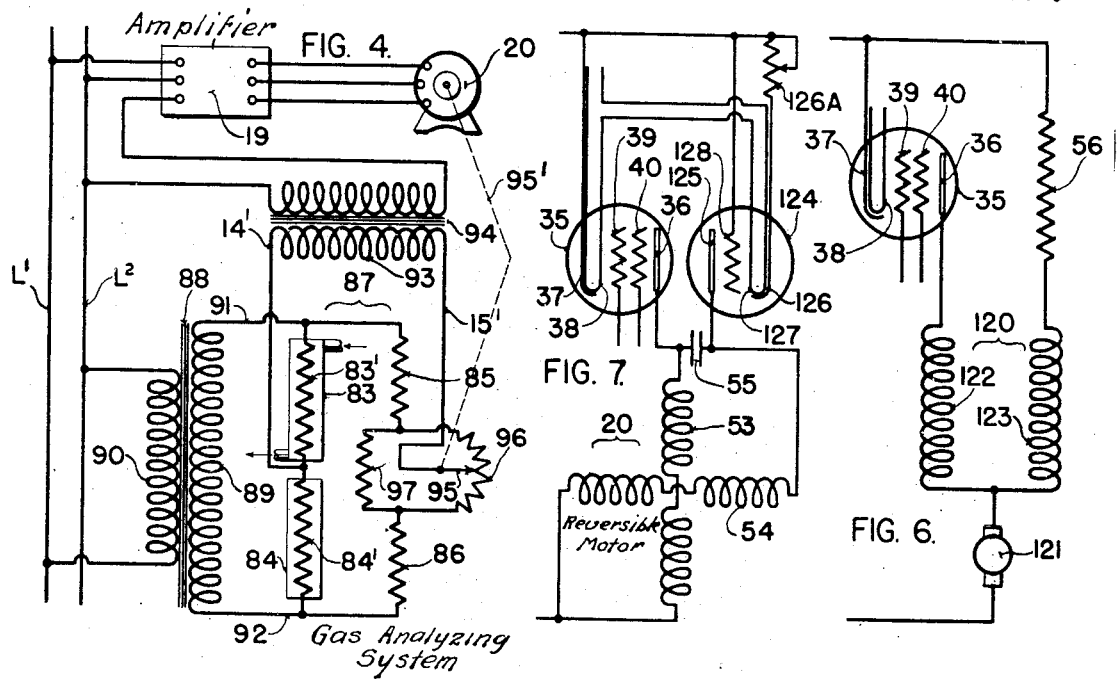
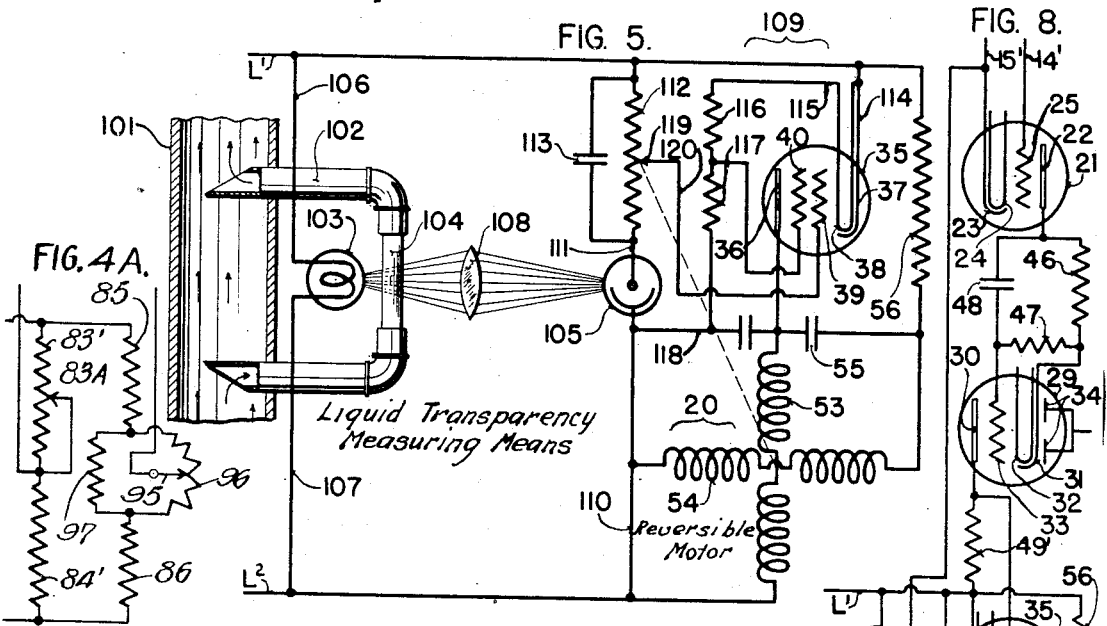
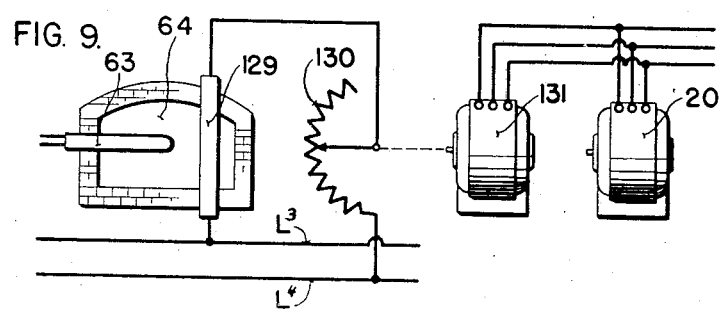
INVENTOR.
THOMAS R. HARRISON.
BY George M. [signature]
ATTORNEY Patented May 30, 1944

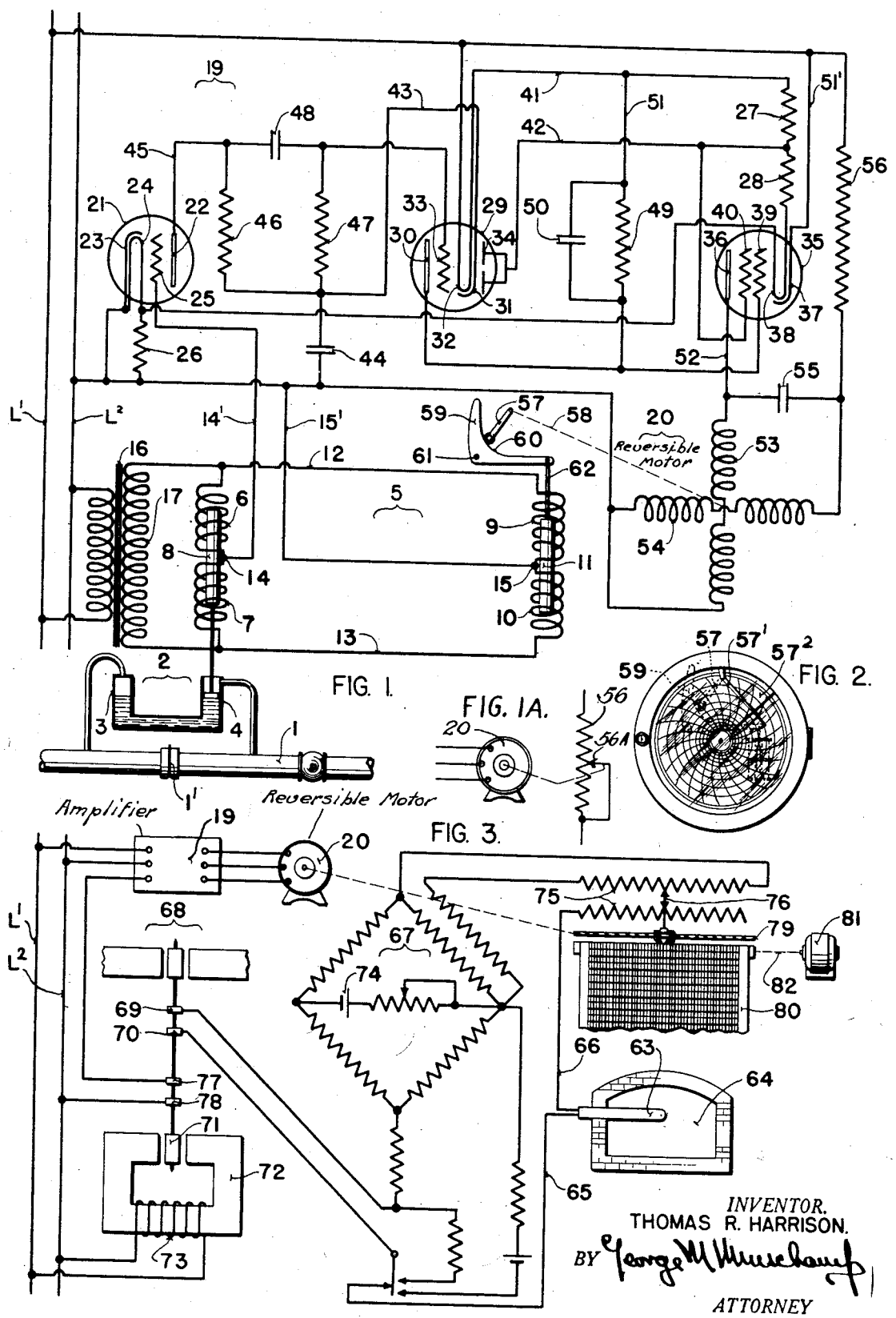

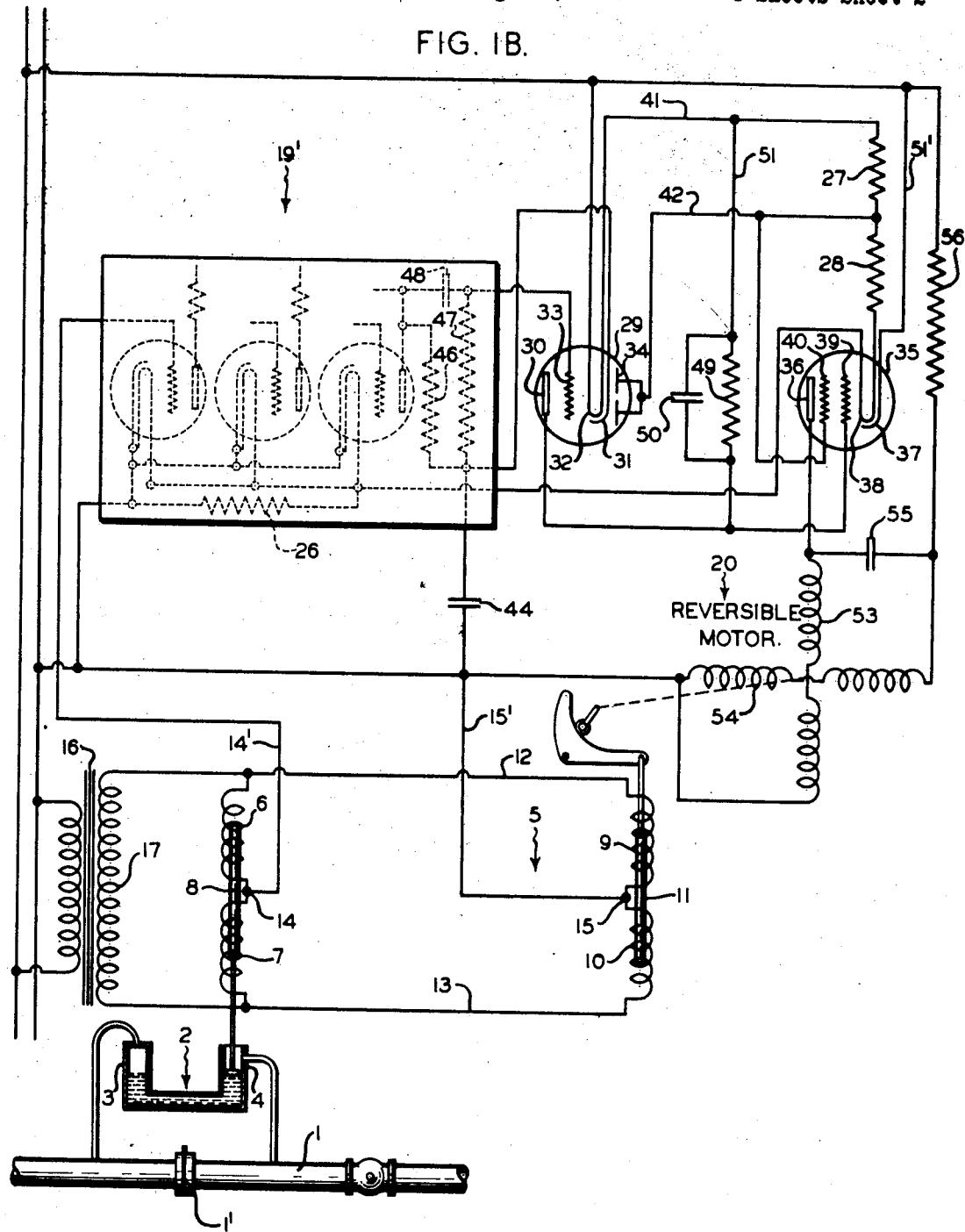

2,349,963

UNITED STATES PATENT OFFICE 2,349,963

MEASURING AND CONTROL APPARATUS

Thomas R. Harrison, Wyncote, Pa., assignor to The Brown Instrument Company, Philadelphia, Pa., a corporation of Pennsylvania Application August 14, 1937, Serial No. 159,198

19 Claims. (Cl. 172—239)

The present invention relates to instrumentalities utilizing reversible electrical motors for positioning an indicating and/or recording element or a control valve, rheostat or the like in which electronic valves are employed for selectively controlling the motor operation.

A general object of the invention is to provide means for selectively controlling a reversible electrical motor for rotation in one direction or the other, in accordance with variations in a control quantity or in a quantity to be measured, from a single electronic valve which may be energized directly from a commercial alternating current supply source.

Another object of the invention is to provide a measuring and/or controlling system which is characterized by its compactness, simplicity, and effectiveness, and which may be operated from a commercial alternating current supply source without the use of transformers and power rectifiers.

The various features of novelty which characterize my invention are pointed out with particularity in the claims annexed to and forming a part of this specification. For a better understanding of the invention, however, its advantages and specific objects attained with its use, reference should be made to the accompanying drawings and descriptive matter in which I have illustrated and described preferred embodiments of the invention.

Of the drawings:

Fig. 1 is a diagrammatic view illustrating one embodiment of the invention as adapted for use in measuring the flow of fluid through a conduit;

Fig. 1A is a fragmentary view of a modification of the arrangement of Fig 1;

Fig. 1B illustrates a modification of the arrangement of Fig. 1;

Fig. 2 is a detail view of a circular chart instrument which may be used for recording purposes with the Fig. 1 arrangement;

Fig. 3 illustrates a modification of a portion of the arrangement of Fig. 1 which is adapted for use in measuring the temperature of a furnace;

Fig. 4 illustrates a further modification of a portion of the arrangement of Fig. 1 which is adapted for use in determining the composition of a gas;

Fig. 4A is a fragmentary view of a modification of the arrangement of Fig. 4;

Fig. 5 illustrates another modification of a portion of the Fig. 1 arrangement which is adapted for use in measuring the transparency of a liquid;

Fig. 6 illustrates the use of the invention with another type of reversible electrical motor;

Figs. 7 and 8 illustrate modifications of the amplifier disclosed in the arrangement of Fig. 1; and Fig. 9 is a diagrammatic representation of the use of the invention in a control system.

In Figs. 1 and 3 of the drawings an arrangement including an electronic device to be described is illustrated for producing effects in accordance with the deflection of an element which controls the electronic device and deflects in accordance with variations in a quantity to be measured, and in which because of the small magnitude of the deflecting force it is not practicable nor desirable to have the said effects directly produced by the deflecting element. More specifically, an arrangement is illustrated, more or less diagrammatically, in Fig. 1 for measuring and/or recording the flow of fluid through a conduit 1, and as shown the invention is adapted to flow measurement in a system including a manometer 2 having opposed legs 3 and 4, partially filled with mercury and upon the respective legs of which are impressed pressures correspondingly varying with the up and down stream pressures, respectively, across a measuring orifice 1' inserted in the conduit 1. The level of the mercury in leg 4 accordingly varies with the flow in conduit 1 and I preferably measure the level variations by means including an inductance bridge network 5.

The inductance bridge network 5 includes a pair of end to end coils 6 and 7 in the transmitter which are placed one above the other, and an armature 8 carried by a float resting on the mercury in leg 4 is adapted to be moved into and out of the coils in accordance with variations in the up and down stream pressures across the orifice 1'. As the armature 8 is moved up and down the inductance of coil 6 is increased or decreased, respectively, relative to the inductance of coil 7. The inductance bridge also includes a pair of end to end coils 9 and 10 placed one above the other and an associated armature 11 in the receiver, which are so connected in the inductance bridge that when the movement of the armature 8 unbalances the inductance bridge by varying the inductance of the coil 6 relative to that of the coil 7, the bridge network may be rebalanced by movement of the armature 11 in an upward or downward direction accordingly as the movement of the armature 8 is upward or downward, respectively. Specifically the remote ends of the coils 9 and 10 are connected to the remote ends of the coils 6 and 7 by conductors 12 and 13 and the electronic device referred to, which is adapted to respond to bridge unbalance and effect rebalancing operations, is connected between the junction 14 of coils 6 and 7 and the junction 15 of coils 9 and 10.

The conductors 12 and 13 are connected to the terminals of the secondary winding 17 of a transformer 16, the primary winding of which is connected to the alternating current supply lines $L^1$ and $L^2$. The coils 6 and 7 are preferably so relatively wound that the two coils are energized in the same direction, that is, the magnetic lines of force simultaneously generated by the current flow through the coils 6 and 7, pass in the same axial direction through the coil by which they are generated, so that the magnetic poles created at the remote ends of the two coils are of opposite polarity, as are the poles created at the adjacent ends of the coils. The coils 9 and 10 are also preferably wound in this manner. It will be apparent that for any normal position of the armature 8 relative to the coils 6 and 7, there will then be a corresponding position of the armature 11 relative to the coils 9 and 10 at which the potential of the junction 15 will be the same as the potential of the junction 14, and when the armature 11 is in this position the bridge will be balanced.

With the described connections, when the armature 8 moves upward from a position in which the bridge network is balanced, in response to an increase in the rate of flow through the conduit 1, the inductance of the coil 6 is increased and the inductance of the coil 7 is decreased. This results in an increase in the potential drop across the coil 6 and a decrease in the potential drop across the coil 7 and thereby the potential of the junction 14 is varied relatively to the potential of the junction 15. The bridge may again be rebalanced by moving the armature 11 in an upward direction relative to the coils 9 and 10 until the potential drop across the coil 9 is equal to that across the coil 6, and the potential drop across the coil 10 is equal to that across the coil 7.

In accordance with the present invention unbalance of the inductance bridge network 5 is detected by an electronic amplifier 19, the input terminals of which are connected by conductors $14^1$ and $15^1$ to the equalizing terminals 14 and 15 of the bridge network and the armature 11 is adapted to be adjusted to a new balance position relative to the coils 9 and 10 by a reversible electrical motor 20 which may advantageously be selectively energized for rotation in one direction or the other by the amplifier 19. Specifically the conductor $14^1$ is connected to the control grid 25 of an electronic valve 21 and the conductor $15^1$ is connected to the cathode 23 thereof. As shown, the electronic valve 21 is a heater type triode and includes an anode 22, the cathode 23, a heater filament 24 and the grid 25. The heater filament 24 is shunted by a suitable resistor 26 and is connected in circuit with the alternating current supply lines $L^1$ and $L^2$ in series relation with resistors 27 and 28 and the heater filaments 32 and 38 of electronic valves 29 and 35. Valve 29 is a heater type duplex diode triode and includes an anode 30, a cathode 31, the heater filament 32, a control grid 33, and a pair of diode plates 34. Valve 35 is a heater type tetrode preferably of the type known commercially as beam power amplifier valves, for example, a 25L6 type valve, and includes an anode 36, a cathode 37, the heater filament 38, a control grid 39, and a screen grid 40.

Anode voltage is supplied to the valve 21 from the alternating current supply lines $L^1$ and $L^2$ through a circuit including the diode plates 34 of valve 29. This circuit may be traced from the supply line $L^1$ to the filament 32 of valve 29, conductor 41, resistor 27, conductor 42, the diode plates 34, cathode 31, and conductor 43 to one terminal of a condenser 44 which constitutes the positive side of a half wave rectifying unit. The negative terminal of the condenser is connected to the supply line $L^2$ and smooths out ripples in the half wave rectified current flow through the diode plates 34 and cathode 31 which impresses a definite voltage across its terminals. The anode 22 of valve 21 is connected to the positive side of condenser 44 by a conductor 45 which has a resistor 46 inserted therein, and the cathode 23 is connected to the negative side of condenser 44 so that a substantially constant direct current potential is maintained on the anode 22.

The magnitude of the direct current voltage maintained on the anode circuit of valve 21 will be substantially less than that of the supply line voltage due to the potential drops through the filament 32 of valve 29, resistor 27 and the diode plates to cathode resistance of valve 29, and since the filament 24 of valve 21 is shunted by the resistor 26 the filament current will be small and the cathode 23 will be virtually cold so that the impedance of the valve will be high and the current conducted thereby will be small. The primary reason for so operating the valve 21 is to keep the anode to cathode resistance of this valve high enough to prevent the flow of ripple current through the valve 21. Another advantage gained by so operating the valve 21 is that the electron bombardment of the gas molecules in the valve and hence the passage of current between the grid 25 and cathode 23 is kept at a minimum. A further advantage gained and one important from a practical viewpoint is that by keeping the anode voltage of valve 21 and the current conducted thereby at a low value, the capacity of condenser 44 required will be relatively small.

Normally the voltage applied to the input circuit of valve 21 will be zero in value so that a substantially steady flow of current will be conducted by the valve and thereby a steady potential drop will be maintained across the resistor 46 which is connected in the anode circuit thereof. When the flow of fluid through the conduit 1 varies, however, the bridge network 5 will be unbalanced and an alternating voltage in phase with or 180° out of phase with the line voltage will be applied to the input circuit of valve 21 so that the latter will be alternately rendered conductive and non-conductive resulting in the flow of pulsating direct current through resistor 46 and in the appearance of a corresponding pulsating potential drop across the latter.

As shown, the resistor 46 is shunted by a resistor 47 and a condenser 48 which are connected in series relation and the point of connection of resistor 47 and condenser 48 is connected to the grid 33 of valve 29 and the other end of resistor 47 is connected to the cathode 31. When a steady current is conducted by valve 21, a potential will be maintained across the plates of condenser 48 which is equal and opposite to the potential drop across resistor 46 so that the potential drop across resistor 47 will be zero, and the grid 33 will then be at the same potential as cathode 31. As the potential drop across resistor 46 increases or decreases, however, it will be apparent the condenser 48 will be further charged through the resistor 47 or will discharge through the latter, and as a result the potential on the control grid 33 will be rendered negative or positive, respectively, with respect to the cathode 31. Anode voltage is supplied to the valve 29 from the supply lines L¹ and L² through a circuit which may be traced from the supply line L¹, the filament 32 of valve 29, conductor 41, a conductor 51 in which is inserted a resistor 49 shunted by a condenser 50, anode 30, cathode 31, conductor 43 to the positive side of condenser 44, and therethrough to the supply line L². It is thus seen that alternating voltage is impressed on the anode circuit of valve 29 so that the valve will be alternately rendered conductive and non-conductive, and it will be noted the magnitude of the pulsating direct current conducted by the valve is adapted to be varied as the conductivity of valve 21 is varied.

When an alternating voltage is applied to the input circuit of valve 21 the latter will be alternately rendered conductive and non-conductive and accordingly a pulsating potential drop will be produced across the resistor 47 to thereby alternately raise and lower the potential of grid 33 of valve 29 relative to the cathode 31. Depending upon the phase relation of the pulsating potential applied to the grid 33 with respect to the alternating voltage impressed on the anode circuit thereof, that is, depending upon whether the two voltages are in phase or displaced 180° in phase, the valve 29 will be rendered less conductive or more conductive during the half cycles when the anode 30 is positive, and the potential drop across resistor 49 will be varied to a corresponding extent. Due to the action of condenser 50, however, the potential drop across resistor 49 will not have a pulsating characteristic, but will gradually rise when a pulsating potential in phase with the supply line voltage is applied to the input circuit of valve 29, and gradually fall when a pulsating potential 180° out of phase with the supply line voltage is applied to the input circuit of valve 29.

As shown the negative end of resistor 49 is connected to the control grid 39 of the valve 35 and the anode circuit of the latter is connected across the alternating current supply lines in an inverted position with respect to the connection of the anode circuit of valve 29 thereto. The anode circuit of valve 35 may be traced from the supply line L¹ to a conductor 51¹, cathode 37, anode 36, and a conductor 52 to one terminal of motor 20 and therethrough to the supply line L². The screen grid 40 is connected to a point in the network which is at a suitable potential and as shown may be connected to the point of connection of resistors 27 and 28. It is thus seen the valve 35 is arranged to be energized directly from the alternating current supply lines L¹ and L² and that the pulsating current conducted by this valve is adapted to be varied in accordance with the magnitude of the direct current potential maintained across the resistor 49.

The reversible electrical motor 20 is of the well known capacitor induction variety having field windings 53 and 54 spaced in quadrature with each other, and so disposed relatively to a squirrel cage rotor not shown, that half of each winding is at diametrically opposite sides of the rotor, and also includes a condenser 55 of suitable capacity. In the normal operation of such motors the magnetic fields set up in the squirrel cage rotor by the windings 53 and 54 have a phase displacement of not more than 90° whereby the fields form together a rotating field such as to cause rotation of the rotor in one direction or the other accordingly as the field set up by winding 53 is displaced in the forward or the backward direction relatively to the field set up by the winding 54. It will be noted the winding 53 is connected in circuit with the anode circuit of valve 35 across the alternating current supply lines L¹ and L², the winding 54 is connected in series with a resistor 56 thereacross, and the condenser 55 is connected between the anode 36 of valve 35 and the point of connection of resistor 56 and the motor winding 54. Thus, when the anode to cathode resistance of valve 35 is approximately equal to the resistance of resistor 56, the impedance of the circuit paths including the windings 53 and 54 will be approximately equal so that the terminals of the condenser 55 will be at the same potential and as a result the magnetic fields set up by the windings 53 and 54 will be approximately in phase and consequently the motor armature will remain stationary. When the anode to cathode resistance of valve 35 is increased or decreased, however, the terminals of condenser 55 will be at different potentials so that in effect the condenser will be connected in a series circuit with one motor winding 53 or 54 in shunt to the other motor winding, and as a result the magnetic field set up by one motor winding will be displaced in the forward or the backward direction with respect to the magnetic field set up by the other winding and the motor armature will be actuated for rotation in a corresponding direction.

When a change in the flow of fluid through the conduit 1 occurs, the level of the mercury in the manometer leg 4 will change to a corresponding extent and the armature 8 will accordingly be moved relatively to the inductance coils 6 and 7 thereby unbalancing the bridge 5. The unbalanced electromotive force produced is impressed on the input circuit of valve 21 where it is amplified and the amplified quantity is impressed on the input circuit of valve 29. Depending upon whether the fluctuating potential impressed on the input circuit of valve 29 is in phase with or 180° out of phase with the anode voltage impressed thereon, or in other words, depending upon the direction of bridge unbalance, the potential drop across resistor 49 will be increased or decreased accordingly, and as was previously explained this potential drop will be substantially free from alternating components due to the action of condenser 50. This direct current potential drop is impressed on the input circuit of valve 35 and operates to control the conductivity of the valve. It is noted that when the term conductivity is used in connection with valve 35 the effective conductivity as regards the tendency for energizing the motor 20 for rotation in one direction or the other is intended. Since alternating voltage is impressed on the anode circuit of valve 35, this valve will conduct pulsating current and as the amplitude of the pulsating current rises above or falls below a predetermined value, which is determined by the magnitude of resistor 56, the armature of motor 20 will be urged to rotation in corresponding direction. As shown a mechanical connection may be provided between the motor armature and the armature 11 so that when the motor is energized for rotation the armature 11 will be moved in the proper direction to rebalance the bridge.

The mechanical connection referred to above may advantageously take the form of a lever 57 which is pivoted for rotation at one end and is adapted to be driven by the motor 20 through suitable reducing gearing indicated by the line 58. The other end of the lever is arranged in cooperative relation with the inside edge 60 of one arm of a bell crank 59 which is pivoted for rotation at the knee 61 thereof, and the end of the other arm is connected to the armature 11 through a link 62 so that as the bell crank is rotated in a clockwise or counterclockwise direction the armature 11 will be moved in a downward or upward direction accordingly. It will be apparent that by suitably shaping the edge 60 that the movement of the armature 11 may have any desired relation to the angular rotation of lever 57 so that a pen arm 57¹ may be mounted for rotation on the same shaft on which the lever 57 is mounted and arranged in cooperative relation with a suitably calibrated chart 57² as shown in Fig. 2 for recording the changes in the flow through the conduit 1. The chart 57² is of the circular type and is continuously rotated at constant speed in a clockwise direction in any convenient manner so that when the pen 57¹ is rotated about its pivot point in response to bridge unbalance a line will be traced on the chart to record the unbalance. Simultaneously the armature 11 will be moved relatively to the coils 9 and 10 rebalancing the bridge and thereby deenergizing the motor 20, and the position of the pen 57¹ will then provide a measure of the flow of fluid through the conduit 1.

As is apparent, the foregoing description of the Fig. 1 circuit arrangement contemplates operation wherein the potential drop across resistor 49 normally assumes a steady value of such magnitude that the effective conductivity of valve 35 is exactly equal to that of resistor 56 whereby the motor 20 will not be actuated for rotation in either direction and will remain stationary. With this mode of operation, a change in the potential drop across resistor 49 in one direction or the other results in a corresponding change in the conductivity of valve 35 and thereby in selective energization of motor 20 for rotation in one direction or the other.

It is noted, however, that the circuit arrangement of Fig. 1 may be made to operate in an alternative manner in which the valve 35 is rendered fully conductive upon slight departure in one direction of the rate of flow through the conduit 1 and is rendered non-conductive upon slight departure in the rate of flow in the opposite direction. For example, by providing an amplifier 19¹ including several stages of amplification in lieu of the valve 21 as illustrated in Fig. 1B to obtain high amplification of the unbalanced alternating voltage appearing between the terminals 14 and 15 of the bridge network 5, and by providing a condenser 50 of such value that it will charge and completely discharge, or substantially so, during each cycle of the alternating voltage applied to the anode circuit of valve 29, it will be clear that the effect of a change in phase of the unbalanced voltage in the bridge network 5 will be to render the valve 35 fully conductive or non-conductive, as the case may be, and thereby to cause selective energization of the motor 20 for rotation in one direction or the other. The actual direction of turning movement of the motor shaft, with either phase relation, depends upon the manner of connection of the motor windings 53 and 54 to the amplifier and may be reversed by varying those connections.

In the explanation of the operation of this alternative form of the arrangement of Fig. 1, it may be assumed that the circuit connections are such that when the valve 35 is fully conductive, the motor 20 will be energized for rotation in the direction to move the armature 11 of the inductance bridge network 5 in an upward direction, and that when the valve 35 is non-conductive, the motor 20 will be energized for rotation in the direction to move the armature 11 in a downward direction.

When the valve 35 is conductive or non-conductive for an appreciable length of time, for example, when the armature 8 is moved relative to the coils 6 and 7 in response to a change in the flow in conduit 1, the motor shaft will be given significant turning movement in one direction or the other. When the rate of flow in the conduit 1 is constant, the valve 35 will be rendered conductive and non-conductive in rapid alternation. Such alternate energization of valve 35 may be due to, and will necessarily result in, rapid, small amplitude oscillatory movements of the shaft of motor 20, and thereby in an oscillatory movement of small amplitude of the armature 11 relative to the inductance bridge coils 9 and 10. This oscillatory movement of armature 11 results in a rapid phase shift of approximately 180° in the bridge unbalanced voltage and thereby in a fluctuating potential drop across resistor 49 which is effective to alternately render the valve 35 fully conductive and non-conductive. As a result the motor 20 will be alternately energized for rotation first in one direction and then the other and will remain stationary.

Thus when the rate of flow in the conduit 1 is constant the valve 35 will be rendered conductive and non-conductive in rapid alternation and the motor 20 will be given small amplitude movements in opposite directions in rapid alternation, but will not be given significant rotation in either direction. Upon a departure of the rate of flow in one direction, the valve 35 will be rendered conductive for an appreciable length of time resulting in actuation of the motor 20 for rotation in a corresponding direction, and upon a departure of the rate of flow in the opposite direction, the valve 35 will be rendered non-conductive for an appreciable length of time resulting in actuation of the motor 20 for rotation in the opposite direction.

It is noted, furthermore, that the circuit arrangement of Fig. 1 may be adapted for operation in which rebalancing is effected by means of varying the resistance of resistor 56 in circuit upon variation in the conductivity of valve 35. When the rebalancing operation is effected in this manner the inductance bridge armature 11 may be fixed in an intermediate position relatively to the coils 9 and 10 and the associated apparatus for moving the armature relatively to the coils may be dispensed with. The alternative rebalancing mechanism referred to may take the form of a contact member 56A indicated more or less diagrammatically in Fig. 1A and shown adjustable along the resistor 56 by the motor 20. With this arrangement it is noted that for each position of the contact member 56A along the resistor 56 at which the motor 20 is stationary and the system is in balance, the resistance of resistor 56 in circuit will be relatively fixed with respect to the effective conductivity of valve 35.

In such an adaptation it will be apparent a chart, such, for example, as described hereinafter in connection with Fig. 3, may be arranged in cooperative relation with the resistor 56, and a pen may be mounted on the contact 56A for recording the variations in the rate of flow through the conduit 1.

In Fig. 3 I have illustrated more or less diagrammatically another advantageous use of my invention in which a thermocouple 63 is arranged to measure the temperature of the interior of a furnace 64. As shown, the terminals of the thermocouple are connected by conductors 65 and 66 to the terminals of a null point potentiometric network 67 which may be of any suitable type such as the Brown potentiometer circuit disclosed in my prior Patent 1,898,124, issued February 21, 1933. The moving coil of a galvanometer 68 is connected in the conductor 65 by means of pig tails or slip rings 69 and 70 and a pick up coil 71, which is positioned in an alternating magnetic field, is connected to the pivot of the galvanometer coil and is arranged to be rotated therewith. The pick up coil is positioned between the poles of a suitable field structure 72 on which is wound a field winding 73 which is energized from the alternating current supply lines $L^1$ and $L^2$, and is so arranged with respect to the poles of the field structure 72 that when the galvanometer moving coil is in its undeflected position the pick up coil is in zero inductive relation to the alternating magnetic field set up in the field structure. When the galvanometer moving coil deflects in one direction or the other the pick up coil deflects accordingly and as a result an alternating voltage in phase with or 180° out of phase with the line voltage will be induced in the pick up coil.

The potentiometric circuit 67 is of a well known type and it is sufficient for the present purposes to note that the potentiometer circuit includes a circuit branch including the thermocouple 63, an opposing circuit branch including a source of known potential such as the battery 74, and resistors 75, a variable portion of which may be connected into the opposed branches by means of a sliding contact 76 whereby the respective effects of the variable and known sources are made equal and opposite, and the galvanometer moving coil is thus rendered undeflected when the circuit is balanced for a given value of the E. M. F. of the thermocouple 63 with contact 76 in a corresponding position along the resistors 75. The position of the contact 76 is then a measure of the value of the thermocouple E. M. F. and may then serve as a measure of the temperature to which it is exposed.

This form of my invention is concerned with the means by which the contact 76 is adjusted back and forth along resistors 75 in response to galvanometer deflection, and as shown includes an electronic amplifier 19 and a motor 20 adapted to be selectively energized therefrom connected to the contact 76, which parts may be identical with the correspondingly identified parts of Fig. 1, for adjusting the contact 76 when the motor is rotated, and for selectively controlling the motor rotation in response to a feeble alternating voltage produced as a result of galvanometer deflection.

When the thermocouple voltage changes the galvanometer moving coil will be deflected in one direction or the other and thereby the pick up coil 71 will be rotated into inductive relation with the alternating magnetic field set up by the field structure 72, resulting in the induction of an alternating voltage in the pick up coil. The phase and amplitude of the alternating current so induced is determined by the direction and extent of deflection, respectively. This induced alternating voltage is connected through suitable pig tails or slip rings 77 and 78 to the input terminals of the electronic amplifier 19, so that, depending upon the direction of galvanometer deflection, the motor 20 will be energized for rotation in a corresponding direction and will effect an adjustment of the contact 76 along the resistors 75 to rebalance the potentiometer circuit.

The shaft of motor 20 is connected in any convenient manner to a shaft 79, which may desirably be a rod having a spiral groove thereon, and the potentiometer contact 76 is mounted on a carriage carried by shaft 79 and is adapted to be moved in one direction or the other as the shaft 79 is rotated. Thus, when the motor 20 is energized for rotation as a result of a change in the thermocouple E. M. F., the motor will effect an adjusting movement of the contact 76 along the resistors 75 in the proper direction until the potentiometer circuit is again balanced. The galvanometer deflection will then be reduced to zero and the motor will come to rest with the contact 76 at a new position along the resistors 75 which position will then be a measure of the temperature of the interior of the furnace 64.

If desired a pen may be mounted on the carriage which carries the potentiometer contact 76 and arranged in cooperative relation with a recorder chart 80 to thereby provide a continuous record of the temperature of the interior of the furnace 64. The chart 80 may be a strip chart as shown and is adapted to be driven in any convenient manner, as for example, by a unidirectional motor 81 through suitable gearing diagrammatically indicated at 82, so that a record of the temperature to which the thermocouple is subjected will be recorded as a continuous line on the chart. It will be apparent that the potentiometer resistors 75 may be mounted on a circular form and that a circular chart similar to that disclosed in Fig. 2 may be employed for recording purposes in lieu of the strip chart 80, if desired.

In Fig. 4 I have illustrated, more or less diagrammatically, a further use of my invention in determining the composition of a gas by measuring or comparing electrical quantities which are dependent on the thermal conductivity of the gas, which in turn is dependent upon the composition of the gas. Such thermal conductivity apparatus for determining the composition of a gas is well known, and in particular it may include a test gas cell 83 and a standard gas cell 84, an electric current carrying resistor being arranged in each cell. In using such a cell structure the test gas is withdrawn from the atmosphere under test and passed continuously through the test gas cell, and the standard gas in the other cell may be air sealed in that cell.

As shown in Fig. 4 the test cell resistor $83^1$ and the standard cell resistor $84^1$ are connected in an electrical Wheatstone bridge circuit 87 so that changes in the relative resistances of the resistors in the test and standard gas cells, due to differences in the thermal conductivities of the test and standard gases, create unbalanced electromotive forces in the circuit which can be measured. Energizing current is supplied the bridge 87 from the secondary winding 89 of a suitable transformer 88 the primary winding 90 of which is connected to the alternating current supply lines $L^1$ and $L^2$ and as shown the terminals of the secondary winding 89 are connected by conductors 91 and 92 to one pair of bridge conjugate points. The other pair of bridge conjugate points is connected by conductors $14^1$ and $15^1$ to the terminals of the primary winding 93 of a transformer 94 and the terminals of the secondary winding thereof are connected to the input circuit of an amplifier 19 which may be identical to the correspondingly identified part of Fig. 1. It will be noted one of the last mentioned bridge conjugate points is the point of engagement of a contact arm 95 with a slidewire resistor 96 across which a resistor 97 is shunted for calibrating purposes. The contact arm 95 is adjusted along the slidewire resistance 96 in accordance with changes in the composition of the test gas to rebalance the bridge network, and in this use of my invention this adjustment may conveniently be effected by a motor 20 which is selectively energized for rotation in one direction or the other by the amplifier 19, which is under control of the bridge network 87. For example, on a change in composition producing a change in the thermal conductivity of the test gas, the resultant change in the resistance of the test cell resistor $83^1$ unbalances the bridge and an unbalanced electromotive force will appear across the bridge equalizing terminals. These unbalanced electromotive forces are impressed on the input circuit of the amplifier 19 and thereby selectively control the energization of motor 20 for rotation in one direction or the other, and hence movement of the contact arm 95 in the proper direction to equalize the unbalanced electromotive forces.

The shaft of motor 20 may be connected in any convenient manner to the contact arm 95, for example, through a suitable connection $95^1$ and it will be apparent a pen arm may be driven through suitable reducing gearing by the shaft on which the contact arm 95 is mounted and arranged in cooperative relation with a suitably calibrated circular chart for recording the variations in composition of the test gas. Or, if desired, the slidewire resistor 96 may be arranged in a manner similar to the arrangement of the resistors 75 of Fig. 3, and the contact 95 may be mounted on a carriage carried by a rod 79 on which a spiral groove is formed for actuating the carriage in one direction or the other as the rod is rotated, and the latter may be driven through suitable gearing by the motor 20. With this latter arrangement a pen may be mounted on the carriage which carries the contact 95 and the pen may be arranged in cooperative relation with a suitably calibrated strip chart for recording purposes.

As will be clear, the circuit arrangement of Fig. 4 is adaptable for uses other than determining gas composition, as for example, remote control of indicators or control motors in correspondence with a transmitting element. Such transmitting element may take the form of a contact member 83A indicated in Fig. 4A which when moved along resistance $83^1$, manually or by variations in a condition such as pressure, flow, or temperature, will effect circuit unbalance similarly to the circuit unbalance effected by a change in gas composition in the specific adaptation shown in Fig. 4. In such an adaptation motor 20 might well be situated at a distance and by virtue of the rebalancing operation would move to a position exactly corresponding to the position of contact 83A.

It is noted that in the arrangements heretofore described the condition responsive apparatus has been of the type which derives a feeble alternating voltage from an original alternating voltage source upon slight variation in a quantity to be measured. It is pointed out however, that this derived alternating voltage is not only amplified for selectively controlling the operation motor 20 but is also converted into a substantially constant voltage capable of controlling the conductivity of valve 35 and thereby of selectively controlling the rotation of motor 20. The function of the circuit arrangement including the valves 21 and 29 is thus seen to incorporate not only the amplification of the feeble alternating voltage applied to the input terminals of the amplifier but also that of converting the amplified quantity into a substantially constant voltage.

It will thus be clearly apparent that in certain applications where a direct current voltage capable of controlling the conductvity of valve 35 is produced upon slight variation in a quantity to be measured, that the electronic valves 21 and 29 and their associated circuit elements may be dispensed with, thereby providing a material reduction in the apparatus involved.

In Fig. 5, I have illustrated more or less diagrammatically such a modification of my invention and for purposes of definiteness and clearness of illustration, have shown this modification as adapted for use in determining the transparency of a liquid in a pipe 101. As illustrated a unit is provided including a by-pass pipe 102 in which a transparent tube 104 made of glass or the like is inserted and which extends in the direction of the flow of liquid through the pipe 101 and through which a representative sample of the liquid is caused to pass. A suitable source of light such as an electric lamp 103 adapted to be energized from the alternating current supply lines $L^1$ and $L^2$, is positioned on one side of the transparent tube 104 and a photoelectric cell 105 is positioned on the other side of the transparent tube. The photoelectric cell 105 is preferably mounted in a casing (not shown) and is so arranged with respect to the lamp 103 that only light from the lamp which is transmitted through the transparent tube 104 is permitted to fall thereon.

The terminals of lamp 103 are connected by conductors 106 and 107 with the alternating current supply lines $L^1$ and $L^2$ and light rays from the lamp are directed through the transparent tube 104 so as to cross a stream of liquid passing through the by-pass pipe, and the rays which are not absorbed pass through the transparent tube and are concentrated by a collimating lens 108 upon the photoelectric cell 105. The resulting electron emission in the photoelectric cell is detected by an electronic amplifier 109 which is adapted to selectively control the energization of a reversible electrical motor 20 for rotation in one direction or the other in accordance with variations in the transparency of the liquid passing through the by-pass pipe 102.

As illustrated, the photoelectric cell 105 is adapted to be energized from the alternating current supply lines L¹ and L² and is shown having its cathode connected by conductor 110 to the supply line L² and its anode connected to the supply line L¹ by a conductor 111 in which a resistor 112 shunted by a condenser 113, is inserted. The amplifier 109 comprises the electronic valve 35 which may be identical with the correspondingly identified part of Fig. 1. The heater filament of valve 35 is arranged to be energized from the alternating current supply lines L¹ and L² through a circuit which may be traced from the supply line L¹, to conductor 114, filament 38, conductor 115, resistors 116 and 117, and conductors 118 and 110 to the supply line L². Anode voltage is supplied to the valve 35 from the supply lines L¹ and L² through a circuit arrangement including the winding 53 of motor 20 and the motor winding 54 is connected in series with a resistor 56 across the supply lines L¹ and L² as in the arrangement of Fig. 1. Thus the motor 20 of Fig. 5 is arranged to be selectively controlled for rotation in one direction or the other or permitted to remain stationary accordingly as the conductivity of valve 35 becomes greater or less, respectively, than the conductivity of resistor 56.

The conductivity of valve 35 is adapted to be controlled by a contact 119 which is adjustable along the resistor 112 and is connected by a conductor 120 to the control grid 39. This form of my invention is concerned with the means by which the contact 119 is adjusted back and forth along the resistor 112 in response to variations in the illumination on the photoelectric cell 105, and as will be apparent, this adjusting operation may advantageously be effected by the motor 20. For example, the contact 119 may be mounted on a carriage carried by a spiral rod 79, as shown in Fig. 3, which rod is arranged in cooperative relation to the resistor 112, and the rod may be driven through suitable gearing by the motor 20 for actuating the contact 119 along the resistor 112 in one direction or the other, as the motor is energized, to a new position along the resistor 112 at which the conductivity of the valve 35 is the same as the conductivity of resistor 56. The current energizing the motor for rotation will then be reduced to zero, and it will be clearly apparent the new position of the contact 119 along the resistor 112 will provide a measure of the illumination on the photoelectric cell 105.

As illustrated the photoelectric cell 105 is adapted to be energized from the alternating current supply lines L¹ and L² and this unit will accordingly be alternately conductive and nonconductive resulting in the flow of pulsating current through resistor 112. Due to the action of condenser 113 the resulting potential drop produced across the resistor will be substantially constant, however, and it will be clearly apparent that for each value of pulsating current conducted by the photoelectric cell 105 there will be a definite position of the contact 119 along the resistor 112 at which the conductivity of valve 35 will be the same as that of resistor 56, and therefore, at which the motor 20 will not be energized for rotation. As the illumination on the photoelectric cell 105 varies, however, the conductivity of this unit will vary accordingly and as a result the potention on the control grid 39 of valve 35 will be changed to a corresponding extent relative to the cathode 37, resulting in a change in conductivity of valve 35 and thereby in selective energization of the motor 20 for rotation in one direction or the other.

If desired, a pen may be mounted on the carriage which carries the contact 119 and arranged to cooperate with a recorder chart 80 to thereby provide a continuous record of the illumination on the photoelectric cell 105 and thereby of the transparency of the liquid in the pipe 101. Or, if desired, the resistor 112 may be mounted on a circular form and a circular chart similar to that disclosed in Fig. 2 may be employed for recording the liquid transparency variations in the pipe 101.

In Fig. 6, I have illustrated, more or less diagrammatically, the combination of my invention with another type of reversible electrical motor, a series field motor 120. As shown the motor 120 includes an armature 121 and opposed field windings 122 and 123. The field winding 122 is connected in the anode circuit of valve 35 and the field winding 123 is connected in series relation with the resistor 56. Thus, the field set up by the winding 123 is adapted to remain substantially constant, and when the conductivity of the valve 35 is the same as the conductivity of resistor 56, the motor 120 will be urged to rotation in both directions and remain stationary. As the conductivity of the valve 35 increases or decreases, however, the field winding 122 will set up a field which is stronger or weaker, respectively, than the field set up by the winding 123 and accordingly the motor will be urged to rotation in a corresponding direction.

In Fig. 7 I have illustrated, more or less diagrammatically, a modification of the arrangement of Fig. 1 in which automatic compensation for line voltage variations may be had. As illustrated, the resistor 56 disclosed in Fig. 1 has been replaced by an electronic valve 124. The valve 124 includes an anode 125, a cathode 126, a heater filament 127, and a control grid 128. The control grid 128 is shown connected directly to the cathode 126 and the valve 124 is so chosen that, when the control grid is so connected to the cathode and the voltage of the supply conductors is constant, the anode to cathode resistance of valve 124 will be identical with that of resistor 56. As illustrated, a resistor 126A may desirably be provided for adjusting the conductivity of valve 124 so that the motor 20 will be stationary when the system is in balance.

The heater filament 127 is shown connected in series relation with the heater filament 38 of valve 35, and when this modification of my invention is adapted for use with the Fig. 1 arrangement the resistance of resistor 28 is preferably adjusted to some lower value so that the potentials of the diode plates 34 of valve 29 and the screen grid 40 of valve 35 will be maintained at their former value.

With this arrangement it will be apparent that by choosing valves 35 and 124 having similar operating characteristics that upon variation in the voltage of the supply conductors the conductivities of valves 35 and 124 will both be varied to a corresponding extent and as a result the motor 20 will remain stationary.

In Fig. 8 I have illustrated, more or less diagrammatically, a modification of a portion of the amplifier 19 disclosed in the Fig. 1 arrangement. It is noted that since the electronic valves 29 and 35 of the amplifier 19 are connected in an inverse manner across the alternating voltage supply conductors L¹ and L² that it is necessary to maintain the potential drop across resistor 49 effective during the half cycle when the anode 30 of valve 29 is negative in order that the potential drop across resistor 49 will be effective to bias the control grid 39 of valve 35 during the half cycle when the anode 36 is positive. The condenser 50 connected across the resistor 49 is provided for this purpose. With the modification disclosed in Fig. 8, the condenser 50 is not required and the valves 29 and 35 are so connected in circuit that their respective anodes will be positive during the same half cycle of the supply line voltage.

As illustrated, the valve 35 is connected across the supply conductors L¹ and L² in series with the winding 53 of motor 20 (not shown in the Fig. 8 arrangement) in a manner identical with that shown in the arrangement of Fig. 1, and a suitable transformer 29A is provided for supplying anode voltage to the valves 21 and 29. The transformer 29A has a primary winding which is connected across the supply conductors L¹ and L² and a secondary winding 29B, one terminal of which is connected to the supply conductor L¹ and the remaining terminal connected to the cathode 23 of valve 21. A resistor 46 is connected between the anode 22 of valve 21 and the cathode 31 of valve 29, a resistor 47 is connected between the control grid 33 and cathode 31, and a condenser 48 is connected across the last mentioned resistors as in the Fig. 1 arrangement. A resistor 49¹ is connected between the supply conductor L¹ and the anode 36 of valve 29 and a connection is provided between the negative end of resistor 49¹ and the control grid 39 of valve 35.

With this modification the heater filaments 24 and 32 of valves 21 and 29 respectively, may be connected in series relation and energized from a suitable secondary winding (not shown) on the transformer 29A, and the heater filament 38 of valve 35 may be energized from another secondary winding (not shown) on the transformer 29A. A resistor 26 may desirably be connected in shunt with the heater filament 24 as shown in the Fig. 1 arrangement. The diode plates 34 of valve 29 may be connected to a center tap on the transformer secondary 29B and the screen grid 40 of valve 35 may be connected through a suitable resistor 39¹ to the supply conductor L².

Thus, when an alternating voltage is applied to the input circuit of valve 21, an alternating voltage of corresponding phase will be applied to the input circuit of valve 29 to produce a pulsating potential drop across resistor 49¹. This pulsating potential drop is applied to the input circuit of valve 35 and operates to vary the conductivity of valve 35 as required to cause actuation of the motor 20 in the proper direction to reduce to zero the alternating voltage applied the input circuit of valve 21.

It will be apparent the motor 20 or 120 may be employed to operate a control valve for controlling the flow of fluid through the conduit 1 or it may be employed to operate a control valve or rheostat for governing the application of an agent to a furnace for producing heat, for example, to the temperature of which the thermocouple 63 of Fig. 3 is responsive, or another motor desirably operated together with the motor 20 or 120 may be so employed. For example, as shown in Fig. 9, a furnace 64, to the heat of which the thermocouple 63 is responsive, is heated by a resistor 129 which is connected to electric supply conductors L³ and L⁴ through a rheostat 130, the adjustment of which is effected by a motor 131. The motor 131 may be exactly like either motor 20 or 120 and is shown as being like motor 20 and connected in parallel therewith. The mechanical connection of the rheostat 130 to the motor 131 is such as to increase and decrease the supply of electric current to the resistor 129 as the temperature to which the thermocouple 63 is responsive drops below or rises above a predetermined level.

It is noted the motor windings are changed in their energizing relations upon variation in the conductivity of valve 35 and may be so changed by placing a capacitance in series with a selected field alternately as shown in Fig. 1 or by selective energization of a series field as shown in Fig. 6 or by other well known reversing means and it will be clear that by "selective energization" of the motor windings I contemplate alternative or conjoint action of the windings.

It is also noted that generally speaking measuring and controlling systems may for purposes of this illustration be roughly divided into two types, namely, those which are manually or otherwise set in response to departures of the measured condition from a value determined by said setting and those continuously and automatically reset or rebalanced through the action of the system itself. In referring to "a predetermined value" I contemplate a value determined in either type and to changes with respect to which the device is responsive.

Subject matter disclosed in this application and not claimed is being claimed in my copending application Serial No. 102,482, filed Sept. 25, 1936 which issued into Patent 2,284,817 on June 2, 1942.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Means for producing reversible operation of a motor having two windings including means for producing a direct current potential of controllable value, energizing means for said motor windings, means of substantially constant value adapted to cause the energizing currents in one of said motor windings to lead the energizing currents in the other of said motor windings to tend to cause rotation of the motor in one direction, and variable means under control of said direct current potential adapted to cause a reversal in said motor winding energizing current relations to tend to cause rotation of the motor in the opposite direction.

2. Means for producing reversible operation of a motor having two windings including means for producing a direct current potential of controllable value, energizing means for said motor windings, electrical means adapted to cause the energizing currents in one of said motor windings to lead the energizing currents in the other motor winding to tend to cause rotation of the motor in one direction, and electronic means under control of said direct current potential adapted to cause a reversal in said motor energizing current relations to tend to cause rotation of the motor in the opposite direction.

3. Means for producing reversible operation of a reversible electrical rotating field motor including means for producing a direct current potential of controllable value, electrical means of substantially constant value tending continuously to bias said motor for rotation in one direction, and means under control of said direct current potential adapted to variably bias said motor for rotation in the opposite direction and to render said first mentioned biasing means ineffective.

4. Means for producing reversible operation of an electrical motor having a plurality of windings including means for producing a direct current potential of controllable value, a source of alternating line current for said motor windings of relatively fixed value tending to so energize the said motor windings that the energizing current in one of said motor windings leads the energizing current in another of said motor windings, a source of relatively variable energizing current for said motor windings under control of said direct current potential tending to so energize the said motor windings that the energizing current in said first mentioned motor winding lags the energizing current in said second mentioned motor winding, and means adapted to vary the value of the second mentioned source.

5. Means for producing reversible operation of an electrical motor having a plurality of windings including a relatively fixed resistor, a condenser, a source of alternating line current for said motor windings of relatively fixed value connected to one of said motor windings through said resistor and connected to another of said motor windings through said resistor and condenser whereby said source of alternating current tends to so energize the said motor windings that the energizing current in one of said motor windings leads the energizing current in another of said motor windings, a source of energizing current for said motor windings of relatively variable value tending to so energize the said motor windings that the energizing current in said first mentioned motor winding lags the energizing current in said second mentioned motor winding, circuit means including said windings, said sources, said relatively fixed resistor and said condenser whereby the effect of said currents are opposed and one or the other predominates and energizes said motor to rotate the latter in one direction or the other accordingly as one of said currents varies from a predetermined value.

6. Means for producing reversible operation of an electrical motor having a plurality of windings including a source of alternating line current for said motor windings of relatively fixed value tending to so energize the said motor windings that the energizing current in one of said motor windings leads the energizing current in another of said motor windings, an amplifier energized by said source of alternating current and having an input circuit and having an output circuit connected to said motor windings, the current in the output circuit of said amplifier tending to so energize the said motor windings that the energizing current in said first mentioned motor winding lags the energizing current in said second mentioned motor winding, means to control the input circuit of said amplifier, circuit means including said windings and sources and said amplifier whereby the effect of said currents are opposed and one or the other predominates and energizes said motor to rotate the latter in one direction or the other accordingly as one of said currents varies from a predetermined value.

7. Means for producing reversible operation of an electrical motor having a plurality of windings including means for producing a direct current potential of controllable value, a source of alternating line current for said motor windings of relatively fixed value tending to so energize the said motor windings that the energizing current in one of said motor windings leads the energizing current in another of said motor windings, a source of relatively variable energizing current for said motor windings under control of said direct current potential tending to so energize the said motor windings that the energizing current in said first mentioned motor winding lags the energizing current in said second mentioned motor winding, a self balancing electrical network including said direct current potential producing means, said windings and sources whereby the effect of said currents are opposed and one or the other predominates and energizes said motor to rotate the latter in one direction or the other accordingly as one of said currents varies from a predetermined value.

8. In apparatus for measuring the magnitude of a variable condition, means for producing a direct current potential variable in amplitude from a mean value in accordance with deviation of said condition from a predetermined value, an alternating current energized device adapted to restore said direct current potential to said mean value upon deviation therefrom, and electronic means controlled by said direct current potential in substantially unmodified form and directly electrically connected to said device adapted to control the energization of said device.

9. In apparatus for measuring the magnitude of a variable condition, means for producing a direct current potential variable in amplitude from a mean value in accordance with deviation of said condition from a predetermined value, an alternating current energized device adapted to restore said direct current potential to said mean value upon deviation therefrom, and electronic means, the input of which comprises said direct current potential in substantially unmodified form, and the output of which is directly electrically connected to said device to control the energization of said device.

10. In apparatus for measuring the magnitude of a variable condition, means for producing a direct current potential variable from a mean value in accordance with deviation of said condition from a predetermined value, a reversible electrical motor adapted to restore said direct current potential to said mean value upon deviation therefrom, and electronic means the input of which comprises said direct current potential in substantially unmodified form and the output of which is directly electrically connected to said motor to control said motor.

11. In apparatus for measuring the magnitude of a variable condition, means for producing an alternating potential which varies in amplitude and phase in accordance with the deviation of said condition from a predetermined value, means for producing a direct current potential variable from a mean value in accordance with the phase and amplitude of said alternating potential, an alternating current energized device adapted to reduce said alternating potential, and means under control of said direct current potential and directly electrically connected to said device to control the actuation of said device.

12. In measuring apparatus the combination with a reversible electrical motor having two windings adapted to be selectively energized for forward and reverse rotation of said motor in accordance with variations in a quantity to be measured, means responsive to variation in said quantity from a predetermined value for deriving from an original source of alternating voltage an additional alternating voltage variable in phase and amplitude according to the direction and extent of the change in said quantity, means for amplifying and converting said derived alternating voltage into a direct current voltage variable from a mean value in accordance with the phase and amplitude of said alternating voltage, an electronic valve having its anode circuit connected in circuit with a source of alternating voltage and with one of said motor windings, a resistor connected in circuit with the other of said motor windings and said source, and means for utilizing said direct current voltage to control the conductivity of said valve.

13. The combination with a normally balanced network of means adapted to unbalance said network, and means adapted to rebalance said network, said last mentioned means including a reversible rotating field motor having two windings selectively energized for forward and reverse rotation of said motor, a source of alternating current, a single electronic valve connected in circuit with said source and one of said motor windings, a fixed resistor connected in circuit with said source and the other of said motor windings, and means responsive to network unbalance adapted to control said valve.

14. In measuring apparatus the combination with a normally balanced network and means responsive to a variable condition adapted to unbalance said network, an impedance in said network adapted to be adjusted to rebalance said network, a reversible electrical motor having two windings adapted to be selectively energized for forward and reverse rotation of said motor adapted to adjust said impedance, and means responsive to said unbalance adapted to control said reversible electrical motor, said last mentioned means including an electronic valve having its anode circuit connected in circuit with a source of alternating voltage and with one of said motor windings and a resistor connected in circuit with the other of said motor windings and said source.

15. Measuring apparatus including in combination an electrical bridge network including an arm adapted to be varied in accordance with the magnitude of a variable condition to produce unbalanced electromotive forces in said bridge network, and a second arm adapted to be varied to reduce said unbalanced electromotive forces, means for varying said second mentioned arm to rebalance said network, said last mentioned means including a reversible electrical motor having two windings adapted to be selectively energized for forward and reverse rotation of said motor, means for translating said unbalanced electromotive forces into a direct current voltage variable from a mean value in accordance with the phase and amplitude of said unbalanced electromotive forces, a source of alternating voltage, a single electronic valve controlled by said direct current voltage and connected in circuit with said source and one of said motor windings, and a fixed resistance connected in circuit with said source and the other of said motor windings.

16. Measuring apparatus including in combination an electrical bridge network including an arm adapted to be varied in accordance with the magnitude of a variable condition to produce unbalanced electromotive forces in said bridge network, and a second arm adapted to be varied to reduce said unbalanced electromotive forces, means for varying said second mentioned arm to rebalance said network, said last mentioned means including a reversible electrical motor having two windings adapted to be selectively energized for forward and reverse rotation of said motor, a source of alternating voltage, a single electronic valve connected in circuit with said source and one of said motor windings, a fixed resistance connected in circuit with said source and the other of said motor windings, and means responsive to said unbalanced electromotive forces adapted to control said valve.

17. Means for selectively controlling a reversible alternating current motor for rotation in one direction or the other in response to variations in a minute unidirectional E. M. F. including means for converting said E. M. F. into an alternating E. M. F., means for amplifying said alternating E. M. F., means for reconverting said amplified E. M. F. into a unidirectional E. M. F., an electronic discharge device connected to said motor and controlling the rotation thereof, and means for applying said reconverted E. M. F. to control said electronic discharge device.

18. In apparatus for measuring the magnitude of a variable condition, means for producing a direct current potential variable in amplitude from a mean value in accordance with deviation of said condition from a predetermined value, an alternating current energized device adapted to restore said direct current potential to said mean value upon deviation therefrom, and electrical means permanently connected to said device and controlled by said direct current potential in substantially unmodified form adapted to control said device.

19. Means for selectively controlling the rotation of an alternating current motor in response to variations in a minute unidirectional E. M. F. including means for converting said E. M. F. into an alternating E. M. F., means for amplifying said alternating E. M. F., means for reconverting said amplified E. M. F. into a unidirectional E. M. F., an electronic discharge device connected to said motor and controlling the rotation thereof, and means for applying said reconverted E. M. F. to control said electronic discharge device.

THOMAS R. HARRISON.